United States Patent Office 3,288,569
Patented Nov. 29, 1966

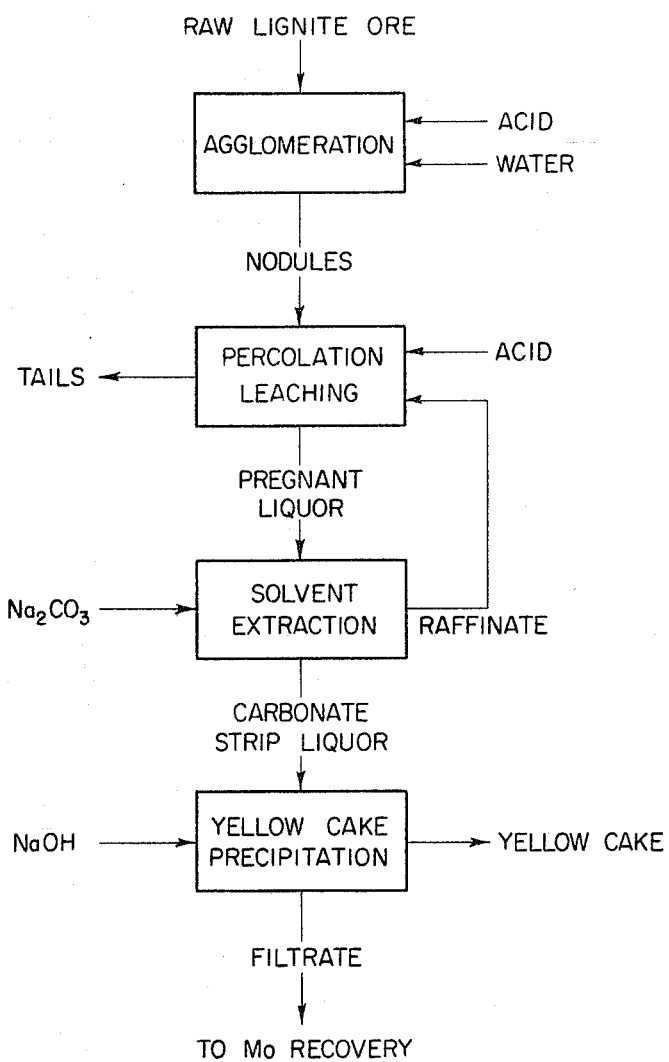

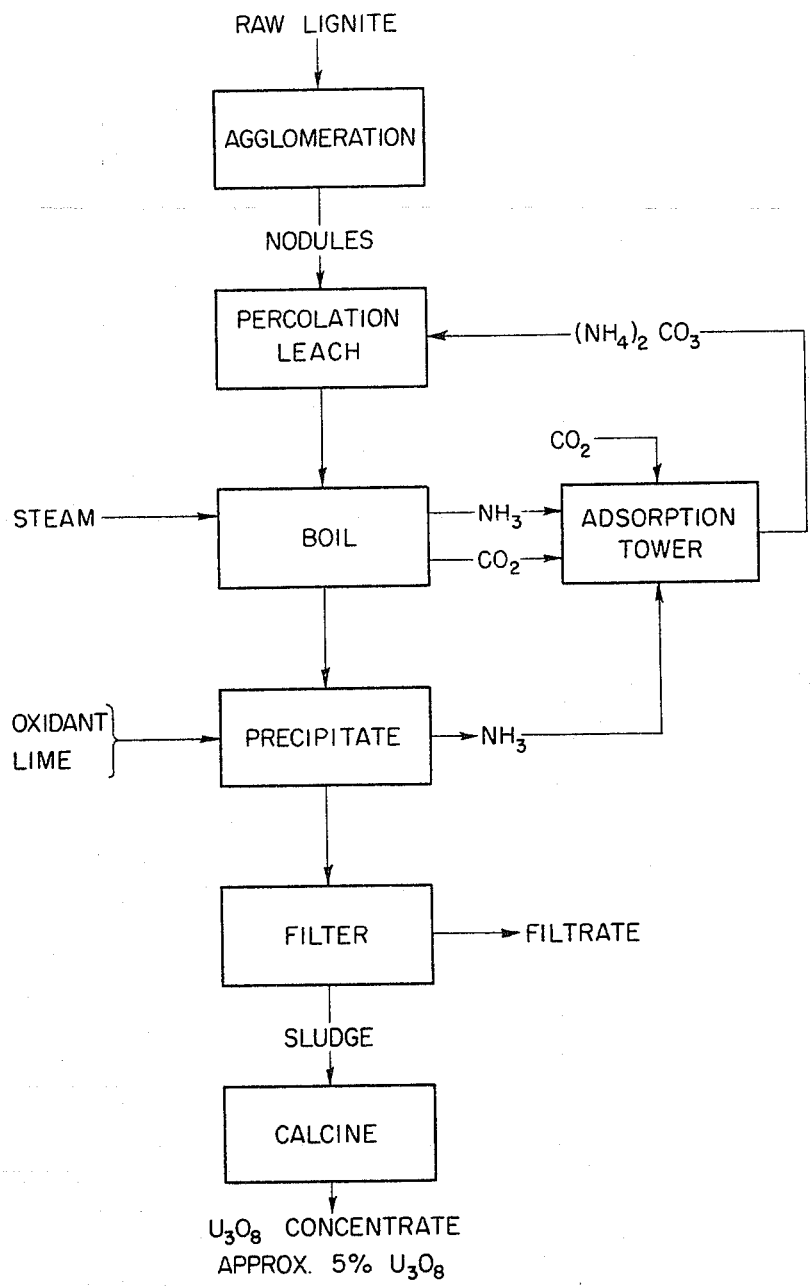

3,288,569
PROCESS FOR THE RECOVERY OF METALS
Angus V. Henrickson and George C. Kane, Golden, Colo., assignors, by mesne assignments, to Susquehanna-Western, Inc., Denver, Colo., a corporation of Wisconsin
Filed Aug. 12, 1963, Ser. No. 301,359
24 Claims. (Cl. 23—319)

This invention relates to a process for the recovery of metals from their ores; more particularly, it relates to a process for the recovery of metals from carbonaceous minerals.

The invention is illustrated herein by a description of its application to the recovery of uranium from lignite as an example of a carbonaceous material containing uranium. The inventive method is not limited to this applicaton as it can be effectively applied to the recovery of uranium from other type ores and to the recovery of other metals from their ores in general. The preferred use of the invention is for recovering metals from ores which are associated with organic materials, these materials making recovery of the metals difficult or impractical by conventional recovery processes.

Ore grade uraniferous lignite exists in commercial quantities in carbonaceous fuel deposits in various areas of the United States, particularly the Dakotas and Montana. The high carbonaceous content of the material has, in the past, made it commercially unfeasible to recover uranium values from the relatively low grade uranium ore associated with the lignite by conventional methods. For example, attempts to concentrate the ore by percolation leaching result in prohibitive clogging of the bed due to the presence of organic slimes and other organic materials. Prior to this invention no method was available for forming carbonaceous ores into nodules for percolation leaching which were sufficiently stable and porous to permit leaching by the required leaching agents. Prior attempts to form nodules of such ores have met with failure in that the nodules were not sufficiently stable to withstand the leaching, or were not sufficiently porous to permit percolation so that clogging of the ore beds resulted. One approach has been to burn the ore to reduce it to ash and then leach the ash with acid by conventional agitation leaching methods. Because of the high acid consumption, however, this method of uranium recovery offers only a marginal profit potential. The reagent cost is an extremely important factor in any method for recovering uranium from relatively low grade ores.

Prior art practices for the recovery of certain metals from their ores have included suspension of the ground ore in a matrix followed by leaching. This procedure has proved unsatisfactory for recovering uranium from carbonaceous minerals due to the interference of organic materials. As mentioned above, the cost of reagents in acid leaching of low grade carbonaceous uranium ores by agitation methods has proved prohibitive. Alkaline agitaton leach methods for recovery of uranium from these ores have not proved successful mainly because of high reagent costs and because of the interference of organic materials. Accordingly, it is an object of this invention to provide a new method for the recovery of metals from their ores by percolation leaching.

It is another object of this inventon to provide a method for the recovery of metals from ores associated with organic or carbonaceous materials.

It is still another object of this invention to provide a commercially feasible method for the recovery of uranium values from lignite contaning uranium.

It is a further object of this invention to provide a method for the recovery of uranium from carbonaceous material by percolation leaching.

It is another object of this invention to provide a process for the formation from carbonaceous minerals of nodules which have the stability and porosity required to permit leaching of the metals therefrom by the required leaching agents.

It is another object of this invention to provide a method for the recovery of uranium from carbonaceous material by percolation leaching in which either an acid or an alkaline leach can be used.

It has been found that the above and other objects can be accomplished by first agglomerating the raw carbonaceous ore to form nodules by a novel process to be described, forming a bed of the nodules and leaching the ore from the nodules by percolation leaching with either an acid or alkaline leaching agent. The nodules are formed by cascading the ore particles under moist conditions and the formed nodules are cured under high humidity conditions to prevent drying. The preferred leaching agents are sulfuric acid and ammonium carbonate. In the preferred procedure, a portion of the leaching agent, acid or basic, is added in the nodulizing step as the nodules are being formed. The metal is recovered from the acid leach liquor or soluton by conventional ion exchange or solvent extraction processes. An improvement in the ammonium carbonate leach modification is the precipitation of uranium from the pregnant leach solution with lime followed by calcining the precipitated uranium and dissolving it in sulfuric acid from which it can be recovered by conventional methods.

One principal inventive step in the method is the formation, prior to percolation leaching, of nodules having suitable characteristics for the formation therewith of a stable and permeable ore bed through which the leach solution will readily pass to leach the uranium from the ore into a clear liquor suitable for direct feed to a recovery system. The formation of suitable nodules from the carbonaceous containing ore converts the ore to a form in which it cannot clog the bed, and supports it in a manner so that it can be effectively contacted by the leaching agent.

The invention will now be described in conjunction with the flow sheets of FIGS. 1 and 2 by its application to uranium ore associated with a large percentage of lignite, referred to herein as lignite ore. The ores used in the tests for most of the results in the tables given below were made from a sampling of lignite ores from various areas in the United States in order to provide samples having a representative composition of lignite ores in general. The chemical analyses of the ores are given in the following table:

TABLE I.—ANALYSIS OF SAMPLES

| Sample | Percent | | | | | |
|---|---|---|---|---|---|---|
| | Moisture | $U_3O_8$ | Mo | Zr | Ash | $CaCo_3$ |
| A | 9.9 | .263 | .224 | .096 | | |
| B | 12.3 | .404 | | | | |
| C | 7.8 | .066 | | | | |
| D | 27.7 | .350 | .336 | .029 | 68.6 | |
| E | 47.3 | .144 | .095 | .095 | 58.5 | 8.57 |
| F | 7.2 | .243 | .037 | | | |

In making samples A, B and C, twelve samples were taken from widely separated areas in North and South Dakota. These twelve samples were composited into three different samples; sample B, a composite of equal weight of the six highest grade of the twelve; sample C, a composite of equal weight of the six lowest grade of the twelve and sample A, referred to as the "master composite," a composite of equal weight of each of the twelve. Sample A is believed to include some of almost every kind of lignite that is potentially mill feed. Samples D and F are from Wyoming, and sample E is a composite of 27 samples from Billings County, North Dakota.

Nodule formation

It has been found that the agglomeration of the raw lignite or other ore to form nodules of the proper type is a highly important prerequisite to the percolation leaching of the ore for a number of reasons. Among the many factors which influence a percolation leach process are particle size and distribution, particle porosity, percolation rate, percolation direction and washing. Particle size and distribution affect the permeability of an ore bed. An excessive amount of fines or slimes in the ore bed will reduce its permeability, sometimes to the extent of complete flow stoppage. Ideal permeability would be achieved by an ore of uniformly sized particles. Proper agglomeration of an ore produces this ideal condition.

The porosity of the individual ore particles will directly affect diffusion of the leach solution into particles and the leach liquor out of the particles. This factor is common to all extraction processes, and the ore grind is controlled primarily by the nature of the specific ore being treated. Properly agglomerated nodules are sufficiently porous to allow rapid leaching rates.

The primary requisite of a percolation rate is that sufficient time be allowed for dissolution and diffusion of the material being extracted. Normal percolation rates are of the order of 1 bed volume of liquid per 8 hours. Too great a percolation rate will physically compress an ore bed and cause clogging unless the bed is extremely stable. Percolation rates must be adjusted to provide an optimum condition of value extraction versus bed stability and reagent consumption. Downward percolation leaching will normally produce a clear liquor. In certain cases, however, upward percolation may be used to prevent slimes from settling and plugging the bed. Flow rates in such cases must be kept low enough to prevent solids from being carried into the liquors. Upward percolation is also quite useful in removing gas locking by either accumulated air or evolved gas. The initial flood of an ore bed is invariably upward percolation. Both downward and upward percolation provide an almost positive displacement of the solution from the ore bed.

The final washing of the percolation leached ore bed is readily accomplished by flushing water through the bed. Washing efficiency is high and percolating one bed volume of wash solution through the ore, followed by draining of the wash solution will normally wash the bed sufficiently.

To be successful, the percolation leach process must (1) produce a stable permeable or bed through which the leach solution will readily pass, (2) leach the uranium or other metal from the ore into a clear liquor suitable for direct feed to a recovery system, and (3) recover the uranium, and any valuable by-products, from the leach liquor. Successful agglomeration for percolation leaching to give the above results must (1) effectively coagulate the slimes from the ore, (2) produce nodules which are physically stable in contact with leach solution, and (3) produce a permeable or bed, It has been found that an optimum moisture content and moisture homogeneity must be achieved before carbonaceous fine material will agglomerate when tumbled or cascaded over itself. Excess moisture will decrease capillary action by decreasing the surface tension holding the particles together. Deficient moisture will weaken the bonding because of insufficient liquid to complete the liquid bridge in the gaps between particles. The rate of moisture addition, an important factor in achieving homogeneity, should be slow enough to allow the moisture to absorb evenly throughout the mass of the material. Rapid addition of water results in poor stability. It has been found as a feautre of this invention that the addition of a surface active or wetting agent sometimes aids the nodulizing process by allowing a rapid and even distribution of moisture around and through the particles.

The method of achieving agglomeration in the examples given herein was to tumble the material in a tilted rotating cylinder. The angle of tilt and rotating speed must be such that the ore will cascade freely over itself. Motion of the ore particles and nodules over themselves imparts a forging action by virtue of the particles colliding with each other.

It has been found that flocculants are helpful, in the case of some ores, in achieving nodule formation and stability by causing the particles to adhere. Various binders may be used to impart rigidity to the nodule structure. The binder material acts to fill in the interparticle void and then harden into a rigid nodule structure. Any binder material used must necessarily be compatible with both the material being agglomerated and with the reagents and conditions employed in the subsequent leaching steps. Examples of suitable binder materials for forming nodules are resins, soil stabilizing agents, silicates, plaster of Paris, or even cement. Of course the use of such agglomerating agents as surface active or wetting agents, flocculants or binders are variants of the invention which are quite often unnecessary as nodules of suitable porosity, coherence, homogeneity, and rigidity can be formed without the use of the agents.

It has been found that the method of curing the nodules is a very important factor in achieving a stable agglomerate structure. By "curing" is meant treating the nodules under humid conditions but not permitting them to dry. A minimum curing time is required for the nodules to reach homogeneity with respect to both contained liquid and any binder material which may be present. The curing period also allows a setting action to occur within the nodules. If agglomerated nodules are allowed to completely dry out after agglomeration, they will shrink. Subsequent wetting, as in a leach, will then cause swelling and the nodules will physically disintegrate as the swelling action breaks the bonds present. The swelling when wetted is primarily caused by the particles being forced apart as the liquid enters the interparticle voids under capillary action. It has been found that curing under saturated humidity conditions is a method of avoiding drying and the resulting nodule instability. Nodules are formed into the percolation leach bed while they still have a high content of moisture.

An additional cause of nodule breakdown during percolation leaching is gas formation. This is seen when acid solution is used for leaching nodules containing calcium carbonate. It is avoided by adding acid during agglomeration. A curing period then permits formation of $CO_2$ and evolution thereof before the percolation step. Accordingly, an important feature of the invention is the addition of a portion of the leach solution during the nodule formation step.

Among the criteria used to assess the stability of nodules are apparent extent of disintegration during leach, extent of reaction with leach liquor, slump, and flow rate.

Stable nodules are uniform in size and spherically shaped as opposed to being flattened or flaky in appearance. Distinct nodules after leaching are a definite indication of stability. Unstable nodules will crack, spall or flatten during the flooding or leaching cycle of a percolation leach. Visible disintegration is indicative of instability. Visible reaction with the leach solution will usually destroy the stability of nodules. Observations indicating poor stability may include effervescense, formation of a precipitate, or a change in color of the nodules. Slump, or the measurement of the amount of settling or slump of a column of agglomerated ore, is a good quantitative test of stability. Slump is best expressed as a percent of the original ore bed depth, measured after leaching but before draining the final liquor. Less than 15% slump is generally indicative of a stable structure. Flow rate, the most definitive, and in practice, the most determinative factor of stability, is dependent upon the permeability of the ore bed. The rate of flow of leach liquor through the ore bed is, therefore, a very good measure of stability. Minimum flow rate should be at least one bed volume per 8 hours for a stable agglomerate, and one volume per hour is more common for stable 1-foot and 4-foot bed depths. Flow rates can be measured either during the leach cycle or during the final drain. Poor stability will usually result in plugging and total restriction of the flow rate.

In addition to being stable, the nodules must have a proper degree of porosity before they can be treated by percolation leaching. In order to extract a mineral, the leaching chemicals must diffuse into the nodule, and the mineral solution must diffuse out of the nodule into the liquor. The nodulizing process by virtue of its effect on nodule density is quite important in controlling porosity. Since each nodule is composed of an aggregation of smaller particles, the density of the nodule will indicate the amount of passageway which exists between the particles.

The agglomeration apparatus used for the examples illustrating this invention consisted of a rotary cement mixture which utilizes an ordinary five gallon bucket as a mixing chamber. The bucket was rotated at either 18 r.p.m. or at 52 r.p.m., the latter speed being employed for most of the work. An important factor in proper agglomerating action is the peripheral speed of the cylinder and its relationship to the cylinder diameter. The mixer frame was mounted on a tilting table so that the incline of the bucket could be changed to give the best tumbling action for the particular charge being agglomerated. The bucket was normally inclined to an angle of 25 to 30 degrees from the horizontal. Agglomerating liquid was added by an air spray device which sprayed a fine stream of liquid onto the cascading surface of the ore.

The following agglomerating procedure was used for the examples given and for all tests for which results are given. The ore is first ground to the required fineness which will be largely dependent upon the leaching characteristics of the ore. Granular, inorganic ore may require a fine grind to achieve reasonable extraction (10 or 20 mesh has been sufficient in most cases). Lignite and other high content organic material may require only —¼″ sizing, or perhaps no sizing at all, to provide nodules permitting diffusion of the leach solution throughout the ore mass.

The ore charge for a five gallon bucket should be approximately 500 grams minimum and 2000 grams maximum for most material. It is added to the bucket and rotated at 52 r.p.m. and inclined 25 to 30 degrees from horizontal. The tilt of the bucket can be adjusted to provide good cascading action. Additives such as binders and oxidants are added to the ore and thoroughly blended before it is charged into the agglomeration apparatus. The required amount of agglomerating fluid is added during cascading by spraying onto the cascading ore particles. The fluid will ordinarily be a water base fluid and preferably contains a portion of the leaching agent to be used in the leaching step. The liquid must be added slowly enough to provide homogeneity in the product. The preferred final moisture content will depend upon the type material being agglomerated. Ordinarily, it should be in a range of 10–20% for granular material and about 40–60% for carbonaceous material. Final moisture content should give nodule size in a range from about ⅛″ to ¼″ in diameter.

Tumbling is continued 10 to 15 minutes after liquid addition. Forging action during this period will harden the nodules and produce a stable structure. The agglomerate is then removed from the bucket, observed and the nodule size distribution recorded. A weighed amount is charged into a sealed percolation vessel for curing. A small amount of water is placed in the bottom and top of the column of the percolation vessel to maintain saturated moisture conditions during the cure period. The nodules must be cured under high relative humidity conditions, preferably about 100% R.H. The curing period will again depend upon the material of the nodules but the nodules must be allowed to set properly. A curing period of about 24 hours was found to be adequate for lignite material.

The above agglomerating procedure was used successfully in percolation leaching performed in 1-foot and 4-foot percolation columns. For greater ore bed depths, the ore grind and nodule size may possibly be adjusted toward the coarser side with no detrimental effects. However, nodule porosity and diffusion rates will necessarily be a consideration if larger nodules are used. Also, in a commercial agglomerating process the ore may be wetted to just below the preferred moisture content before entering the agglomerating machine.

It was found that lignite could be satisfactorily agglomerated for percolation leaching without the use of any wetting, flocculating or binding agents but by merely cascading with addition of leach solution to the particles under the proper conditions of temperature and moisture, followed by curing under the proper humidity conditions. As a result of a large number of tests on lignite ores the following general preferred process was established. The ore, ground to four mesh, is agglomerated slowly by spraying with water containing the leaching agent, such as sulfuric acid or ammonium carbonate. Wetting agents, such as, "Aerosol" and flocculating agents such as "Separan," or, equivalents thereof can be added if necessary to improve stability. The acid or base, depending upon which is used for leaching, "Aerosol," and "Separan" content of the agglomerating solution should be adjusted to give about 100 pounds of acid or base and about 0.1 pound each of "Aerosol" and "Separan" per dry ton of ore in the nodules. The nodules should be cured about 24 hours at about 100% relative humidity prior to leaching. The nodules are not permitted to dry out and are used in the bed in the moist condition while containing a high percentage of moisture. The ore bed should be flooded by upward percolation and leached with three bed volumes of leaching solution every 24 hours. A temperature below about 50° C. is preferred for the nodulizing step.

A large number of complete runs from agglomeration to final recovery were made on samples from A–F, inclusive, and others, using acid and alkaline leaching agents, representative results being recorded in Tables II–VII, inclusive. In these runs the agglomerating procedure described above was used. Representative agglomerating procedure and results from these runs as respects nodule formation is set forth in Tables II, III and IV which are based respectively, on procedure for $H_2SO_4$, $(NH_4)_2CO_3$ and $NA_2CO_3$ leaches. The results shown in Tables II and III were obtained on samples A and C. The analysis for the sample of Table IV is given in the table.

TABLE II.—$H_2SO_4$ PERCOLATION LEACH

Sample A:
    Assay: .263% $U_3O_8$; .224% Mo; .096% Zr.
    Moisture: 9.9%; Grind: —¼″.
Agglomeration procedure: Agglomerated at 23° C., 52 r.p.m. in 5-gallon bucket. 77.9 gm. (346 lb./ton) of $H_2SO_4$ added directly from beaker and then ore sprayed with tap water. Nodules 25.1% moisture.
Cure: 68 hrs., 23° C., 100% relative humidity.
Leaching vessel: 1.85″ I.D. x 1′ column.
Leaching procedure: Constant flow, downward percolation, one bed-volume removed every 8 hours.
Flood solution: 5% $H_2SO_4$, pH 0.65.
Liquid volume in ore bed: 310 ml.
Leaching temperature: 23° C.
Leach solution: Same as flood.

Dry ore wt.: Agglomeration, 450.5 gm. Leach, 208.4 gm.
Lb. dry ore/cu. ft.: Crushed ore, 45. Percolation bed, 25.

|  | Chemical Consumption, Lb./Ton |
|---|---|
|  | $H_2SO_4$ |
| Additives: |  |
| Agglomeration | 346 |
| Leach | 1,006 |
| Total | 1,352 |
| Excess | 845 |
| Consumption | 507 |

Slump (before drain) from 12″ to 12″=0% of original.
Dilution (vol.-ton liquor/dry ton ore).—10.6:1 liquor; 5.6:1 wash water:

| Mineral Extracted | $U_3O_8$ | Mo | Zr |
|---|---|---|---|
| Percent Extraction | 92.6 | 31.8 | 39.5 |
| Material Balance, Percent | +4.6 | −7.1 |  |

Remarks: Column very stable. Final flow rate 6480 gal./sq. ft./day.

TABLE III.—$(NH_4)_2CO_3$ AGGLOMERATION AND PERCOLATION LEACH

Sample B:
Assay: .464% $U_3O_8$; Moisture: 12.3%; Grind: −¼″.
Agglomeration procedure: Agglomerated at 20° C., 52 r.p.m. in 5-gallon bucket. Sprayed with solution containing 42 g./l. $(NH_4)_2CO_3$ and .5 g./l. each "Aerosol OT" and "Separan" 2610. Nodules 38.7% moisture.
Cure: 22 hrs., 23° C., 100% relative humidity.
Leaching vessel: 1.85″ I.D. x 1′ column.
Leaching procedure: Quiescent leach, one bed-volume removed every 24 hours.
Flood solution: 50 g./l. $(NH_4)_2CO_3$+.1 g./l. each "Aerosol" and "Separan."
Liquid volume in ore bed: 250 ml.
Leaching temperature: 23° C.
Leach solution: Same as flood; pH 8.7; 15.86 g./l. $NH_3$.
Dry ore wt.: Agglomeration, 438.5 gm. Leach, 256.0 gm.
Lb. dry ore/cu. ft.: Crushed ore, 43.3 percolation bed, 28.0

|  | Chemical Consumption, Lb./Ton | | | |
|---|---|---|---|---|
|  | "Aerosol OT" | "Separan" 2610 | $(NH_4)_2CO_3$ | $NH_3$ |
| Additives: |  |  |  |  |
| Agglomeration | .61 | .61 | 51 | 11 |
| Leach | 2.53 | 2.53 | 1,187 | 393 |
| Total | 3.14 | 3.14 | 1,238 | 404 |
| Excess: |  |  |  |  |
| Liquors |  |  |  | 293 |
| Tail |  |  |  | 83 |
| Total |  |  |  | 376 |
| Unaccounted for Loss |  |  |  | 28 (6.9%) |

Slump (before drain) from 13″ to 11½″=11.5% of original.
Dilution (vol.-ton liquor/dry ton ore): 12.2:1 liquor; 1.7:1 wash water:
Mineral extracted _____ $U_3O_8$
Percent extraction _____ 90.2
Material balance, percent _____ +11.4
Remarks: Good stability. Final flow rate 31.2 gal./sq. ft./day (1.5 ml./min.).

TABLE IV.—$Na_2CO_3$ PERCOLATION LEACH DATA

Sample assay: .153% $U_3O_8$; Moisture: 41.5%; Grind: −¼″.
Agglomeration procedure: Agglomerated at 23° C., 52 r.p.m. in 5-gallon bucket. Added $Na_2CO_3$ and $NaHCO$ dry. Sprayed with solution containing .5 g./l. each "Aerosol OT" and "Separan" 2610.
Cure: 4 days, 23° C., 100% humidity.
Leaching vessel: 1.85″ I.D. x 1′ column.
Leaching procedure: Quiescent leach. Five-bed volumes removed at 24-hour intervals. Water flush after fifth bed-volume.
Flood solution: 50 g./l. $Na_2CO_3$, 20 g./l. $NaHCO_3$, .1 g./l. each "Aerosol" and "Separan."
Liquid volume in ore bed: 308 ml.
Leaching temperature: 23° C.
Leach solution: Same as flood.
Dry ore wt.: Agglomeration, 585 gm. Leach, 186.1 gm.

|  | Chemicals Added, lb./Ton | | | | |
|---|---|---|---|---|---|
|  | $NaClO_3$ | "Aerosol OT" | "Separan" 2610 | $Na_2CO_3$ | $NaHCO_3$ |
| Agglomeration | 5.0 | .03 | .03 | 100 | 40 |
| Leach |  | 1.61 | 1.61 | 820 | 328 |
| Total | 5.0 | 1.94 | 1.94 | 920 | 368 |

Slump (before drain) from 12″ to 11⅞″=1.0% of original.
Dilution (vol.-ton liquor/dry ton ore)=9.8:1:
Mineral extracted _____ $U_3O_8$
Percent extraction _____ 88.2
Material balance, percent _____ −16.8
Remarks: Nodules very stable. Final flow rate, 150 ml./min. (3140 gal./sq. ft./day).

The nodules in each case were very stable and the permeability of the beds excellent as indicated by the flow rates obtained. No gassing of the ore beds was excessive and the slump values observed indicated high stability of the nodules. The leach liquors from tests on Tables II and III were perfectly clear.

Although the limits of the various process limitations used to obtain nodues of the required characteristics will vary with the ore within the scope of the invention, it can be said that the objective of the process is to provide nodules having a stability and porosity adequate to withstand effective percolation leaching of ore therefrom in feasible amounts with a suitable leaching agent.

Proper wetting and cascading are important and the application of liquid by spraying during cascading provides the most uniform distribution of moisture on the particles. However, the most important factors in the process are the application of part of the leach solution during nodulizing, and curing for an adequate period under the proper humidity conditions. The addition of the leaching agent to the ore starts the leaching process, stabilizes the nodules and insures the completion before nodule formation of any chemical reaction which otherwise may occur in the nodules after formation and cause disintegration. Curing the nodules under the proper humidity conditions is a critical factor in the formation of stable nodules. Drying the nodules with curing in a low humidity atmosphere will cause them to shrink and later expand with cracking upon contact with moisture in the ore bed.

As used in the specification and claims the term "agglomerating" means treatment of the ore to form suitable nodules. By "agglomerating agents" as used herein is meant agents such as wetting, flocculating and binding agents or other agents which are added in the agglomerating step to improve the stability and porosity of the nodules. By "leaching agent" is meant the liquid medium used for percolation leaching to dissolve the metal out of the nodules. By the term "carbonaceous" is meant organic material containing broadly as well as carbon containing.

*Percolation leaching of nodules*

For the examples of percolation leaching given herein the nodules used to form the beds were made in accordance with the nodulizing procedure described above. The stability, porosity and other desirable required properties of the nodules formed is attested by the recovery results obtained. The ore beds of nodules all gave high flow rates with acid percolation leaching as well as with alkaline percolation leaching. It was found that it is important in the ammonium carbonate leaching that the acidic constituents of the lignite be neutralized during agglomeration by addition of a portion of the leaching solution, otherwise initial contact with ammonium carbonate will cause evolution of carbon dioxide. Likewise, it is important for acid leaching that acid be added during agglomeration so that any gas forming reaction between acid and ore constituents will be completed before nodule formation.

The percolation leach equipment used for the examples consisted of two different sized columns and associated liquor transfer apparatus. The smaller scale tests were performed in standard 50 ml. by 400 ml. test tubes fitted with an outlet tube on the bottom and a stoppered inlet tube on top. The effective ore bed volume was 1.85" in diameter and 12" deep. The ore bed was supported on a stainless steel wire screen (20 mesh) with a ¼" to ½" layer of glass wool above the screen as a filter.

The large columns were 2¾" I.D. x 53" cylindrical Lucite tubes fitted with stoppered ¼" inlet and outlet tubes. A 3 mesh wire screen covered by a double layer of duck cloth was used as a bed support and filter.

Leach solution was normally gravity fed from a reservoir to the top of the column for downward percolation and to the bottom of the column for upward percolation. The liquid was controlled to a constant level, and removed from the column by a jack-leg for downward percolation and by a siphon for upward percolation.

Constant flow rates were attained by the use of a constant head apparatus and capillary tubes, or by use of a metering pump. Liquor recycling was done with a metering pump. All leaches were performed by flooding the ore bed with the leach solution, except in one instance where the leach solution was trickled through the bed.

The normal leach cycle involved the following steps:

(a) The ore bed was flooded by upward percolation at a flow rate of 1.5 ft./hr. This helped to avoid any air pockets or gas locking caused by evolved gas. Upward percolation was continued until liquid level was the desired distance above the ore bed (1 inch for 1 ft. column, 2 inches for 4 ft. column). All flow rates were controlled in the feed line. If gas evolution was encountered the flow rate was reduced to allow gas to escape.

(b) If downward percolation was used, a jack-leg tube was attached to the bottom column outlet to control the liquid level above the ore bed. Leach solution was metered through a feed line in the top of the column at the rate and time interval prescribed by specific test conditions.

(c) After the leaching cycle was completed the last volume of liquor was drained from the ore bed and the bed was washed with at least one bed volume of wash liquid (usually water) by upward percolation and draining.

(d) If a tail assay was required, the tail was dried to constant weight at 110° C., ground to 100 mesh and sampled for assay.

A complete test of the acid percolation leach flow sheet of FIGURE 1 was made using samples A, B, C, D, E and F and the results are summarized in Table V.

TABLE V.—SULFURIC ACID PERCOLATION LEACHING OF AGGLOMERATED URANIFEROUS LIGNITE ORES

| | Ore agglomerated and leached with $H_2SO_4$ in 1' column, except Test E in which 4' column was used | | | | | | | | |
|---|---|---|---|---|---|---|---|---|---|
| Sample No | A | | B | C | D | | | E | F |
| | 1 | 2 | | | 1 | 2 | 3 | | |
| Head Sample: | | | | | | | | | |
| Percent $U_3O_8$ | .263 | .263 | .464 | .066 | .350 | .350 | .350 | .144 | .243 |
| Percent Mo | .224 | .224 | | | .336 | .336 | .336 | .095 | .037 |
| Percent Zr | .096 | .096 | | | .029 | .029 | .029 | .095 | |
| Lb. dry ore/cu. ft.: | | | | | | | | | |
| Crushed ore | 45 | 45 | 43 | 46 | 44 | 44 | 44 | 21 | 64 |
| Nodules | 25 | 25 | 27 | 31 | 26 | 27 | 26 | 20 | 36 |
| Leach: Head solution, Percent | | | | | | | | | |
| $H_2SO_4$ | 5 | 5 | 1 | 1 | 5 | 5 | (¹) | 5 | 1 |
| Tons liquor/ton ore | 10.6 | 9.3 | 12.5 | 6.4 | 14.1 | 13.2 | 7.5 | 19.4 | 4.7 |
| Total leach time, hr | 132 | 49 | 216 | 168 | 171 | 137 | 68 | 88 | 97 |
| Final flow rate | 6,480 | (²) | (³) | (³) | 6,900 | 6,080 | 6,100 | 460 | (³) |
| Percent Extraction: | | | | | | | | | |
| Zr | 39.5 | 34.2 | | | 32.8 | 35.9 | | 9.6 | |
| Mo | 31.8 | 34.9 | | | 23.4 | 23.7 | | 52.9 | 46.2 |
| $U_3O_8$ | 92.6 | 91.4 | 82.1 | 80.1 | 93.6 | 92.3 | 89.2 | 92.7 | 90.5 |

¹ Solvent extraction raffinate.
² Trickle leach.
³ High (>1,000).

The uranium recoveries are around 90% and above for most of the tests. No difficulties were encountered in solvent extraction and yellow cake precipitation.

All solvent extraction data reported herein was obtained using conventional amine solvent extraction techniques. After percolation leaching with sulfuric acid, uranium is extracted from the pregnant leach solution by conventional solvent extraction or ion exchange procedures. For extraction of uranium from the leach liquors formed in the above examples, a tri-fatty amine was used as the organic extractant. The organic extracted carbonaceous material as well as the metals dissolved in the acid leach, leaving the raffinate clear and available for reuse. The organic was then stripped with soda ash solution which stripped the carbonaceous material as well as uranium and molybdenum and zirconium from the amine, and left the organic perfectly clear for use. Excess caustic soda was used to precipitate the yellow cake from the soda ash pregnant solution and much of the carbonaceous material precipitated with the yellow cake. This carbonaceous material was burned off from the filtered precipitate and gave a yellow cake that met all AEC specifications.

The high recoveries of uranium and the other metals illustrated by the data in Table V proves the effectiveness of the agglomeration step in the percolation leach process. Leaching characteristics in all respects, including ore bed stability and permeability were entirely satisfactory. It was found that the solvent extraction raffinate could, in most cases, be re-used as leach liquor. This shows the effectiveness of the bed for removing organic material and is in itself a large contributing factor to reduction in acid consumption.

The best solution flow rate for acid percolation leaching of lignite was found to be one bed volume every 8 hours (approximately 100 gallons per square foot per day for a 10 foot bed depth). A continuous flow at this rate usually gives 90% $U_3O_8$ extraction within a total leach time of four days. Using the agglomeration and leaching methods presented above, the ores tested all gave high flow rates.

All of the examples presented herein were made using either 1-foot or 4-foot percolation columns. The data indicates, however, that stability would carry through into larger production size units and that the nodules would not be crushed appreciably by the weight of the ore bed, even with a 10-foot bed depth.

Tests were made to determine the effects of pH on percolation leach of lignite ores. Two tests were run using sample B to determine (1) uranium extraction as a function of pH, and (2) uranium extraction with sodium nitrate leach at pH 2.5 (sodium nitrate is a good ion exchange eluent). Amine solvent extraction was used. These two tests gave relatively poor uranium extraction except in the range of pH 1 or lower. It was concluded from these and other tests that acid leaching of lignite ores should be conducted in a range of pH 1 or lower in order to obtain best yields of uranium extraction.

Solvent extraction tests made on a composite liquor sample made from samples B and D showed that no difficult operation problems occur during solvent extraction of the acid leach liquors, such as, emulsion formation or inadequate phase separation. The solvent used was a trifatty amine in kerosene modified with 2 volume percent of isodecanol. Calculated extraction coefficients based on the results were high enough to provide for complete extraction in three stages, indicating the complete feasibility of the recovery of uranium from the acid percolation leach liquors. Additional evaluation tests of amine solvent extraction from the standpoint of operability and reagent consumption conclusively demonstrated that the recovery of uranium by this method is entirely feasible from reagent consumption standpoint and that it produces yellow cake from acid percolation leach liquors meeting all requirement specifications.

*Alkaline percolation leach*

The use of alkali metal and ammonium carbonates as agglomerating and leaching agents in the overall process was extensively tested. As set forth below, ammonium carbonate is the preferred leaching agent from a commercial standpoint; however, tests demonstrated that alkali metal carbonates, such as, sodium carbonate and bicarbonate, are highly effective. Other alkali metal carbonates, such as, potassium carbonate and bicarbonates are operative for the process.

Table IV above presents results of a representative test in which sodium carbonate and sodium bicarbonate were used as agglomeration and leaching agents in the process.

The results in Table IV indicate the stability of the nodules formed. This is supported by flow rates, slump value and absence of gassing. Although sodium bicarbonate was added it is obvious that sodium carbonate alone can be used. The definition of sodium carbonate and ammonium carbonate as used in the claims includes either the carbonate alone or the combination of sodium carbonate and bicarbonate. Although the wetting agent "Aerosol OT" and the flocculating agent "Separan" were used in the test and it has been found that their use is beneficial in some cases, their use is not critical and the process is effective without them. The significantly high percentage yield of 88.2 for uranium demonstrates the effectiveness of alkali metal carbonate leaching agents.

Ammonium carbonate is the preferred carbonate as an alkaline leaching agent because it is less reactive than strong alkali metal carbonates toward the organic constituents in carbonaceous ores, and ammonia can be recovered for reuse in the process, these advantages resulting in drastic reduction in reagent costs.

Experimental results demonstrated that uranium in lignite ore is mostly in an adsorbed form, and as such can be extracted by an "ion exchange" elution mechanism. Because of this mechanism, ammonium carbonate leaching does not require elevated temperatures and air oxidation to dissolve the uranium. Due to the volatility of ammonia and ammonium compounds the use of ammonium carbonate provides optimum reagent recovery from solution and possibly from solid residue by the combination of heat and addition of lime. Lime acts to liberate the ammonia from any non-volatile chemical compound, such as ammonium sulfate which may be present. The underlying principle of ammonium carbonate percolation leaching, therefore, is that the uranium can be extracted by an ion exchange type mechanism, and the ammonia can be recovered for reuse. In theory, actual reagent consumption can be restricted to lime in an amount equivalent to the sum of the acidic constituents and cationic ion exchange capacity of the lignite.

FIG. 2 shows the flow sheet for ammonium carbonate percolation leaching. This flow sheet was used for the tests for which results are reported in Table VI. In accordance with the invention, the ore was agglomerated by the method disclosed above, with addition during agglomeration of either ammonium carbonate and/or wetting or flocculating agents. Table III above presents data on the agglomeration procedure used for alkaline leaching.

In accordance with the flow sheet of FIG. 2, the leach liquor was boiled to remove ammonia gas and carbon dioxide, and to partially precipitate the uranium. Complete precipitation of uranium and complete removal of ammonia is accomplished by the addition of an oxidant and lime. The uranium is precipitated as $U_3O_8$ mixed with organic material, and the final product is obtained by removing the organic material in a calcination step. The carbon dioxide and ammonia gas are collected and resued. The overall reagent consumption is in theory confined to the use of lime and carbon dioxide since the ammonia is recycled.

Data from ammonium carbonate percolation leaching of lignite ore samples A, C, D and E agglomerated and leached at 23° C. is shown in Table VI.

TABLE VI.—AMMONIUM CARBONATE PERCOLATION LEACHING OF URANIFEROUS LIGNITE ORES AGGLOMERATED AND LEACHED AT 23° C.

| Sample | A | C | D | E |
|---|---|---|---|---|
| Head Assay: | | | | |
| Percent $U_3O_8$ | .263 | .464 | .066 | .144 |
| Percent Mo | .224 | | | |
| Percent Zr | .096 | | | |
| Lb. Dry Ore/Cu. Ft.: | | | | |
| Crushed Ore | 45 | 43 | 46 | 21 |
| Nodules | 27 | 28 | 22 | 19 |
| Leach: | | | | |
| Head Solution, g./l. $(NH_4)_2CO_3$ | 50 | 50 | 50 | 50 |
| Solution Flow Rate, hrs. per bed-vol | 8 | 24 | 24 | 24 |
| Tons Liquor/Ton Ore | 17.4 | 12.2 | 7.4 | 15.4 |
| Tons Wash Water/Ton Ore | | 1.7 | 1.3 | 3.5 |
| Total Leach Time, Hrs | 139 | 276 | 97 | 240 |
| Final Flow Rate, gal./sq. ft./day | 52 | 31 | 31 | 2,000 |
| Percent Extraction: | | | | |
| Zr | 41.2 | | | |
| Mo | 48.8 | | | |
| $U_3O_8$ | 87.2 | 90.2 | 74.4 | 80.0 |

As seen from Table VI, uranium extraction from the four lignite samples ranges from 74.4% to 90.2%. The lower extractions were obtained in accelerated tests with lower dilution and shorter leach time, so over-all extractions would probably be in the 85% to 90% range for completed leach tests. Sample A, the most typical of the available ore supply, gave 87.2% uranium extraction, and 41.2% zirconium extraction. An optimum leach rate in time is estimated to be a maximum flow rate of 1-bed volume every 8 hours for a total continuous leach time of five or six days.

The ore was agglomerated with a solution of ammonium carbonate and sufficient cure time was allowed for complete evaluation of $CO_2$ gas. Flow rates, obtained were more than sufficient for mill use, in which a flow rate of 10 gal./sq. ft./day (1-bed volume/8 hours) is adequate.

The uranium was precipitated from the ammonium carbonate leach liquor in accordance with the flow sheet shown in FIG. 2. Ordinarily, if ammonium carbonate solution containing uranium is boiled and sparged with steam, the ammonium carbonate is volatilized and uranium precipitates as $UO_3$; however, the presence of organic compounds in lignite leach liquor prevents the precipitation of uranium by this simple method, probably because of the formation of complex compounds. In accordance with the process of the invention, a small amount of a strong oxidizing agent was added to the solution after boiling off the ammonium carbonate and the pH raised to 12 with lime. This precipitates the uranium completely as a low grade material containing organics as well as some gypsum and a small amount of calcium carbonate. The addition of lime has the added advantage of liberating any ammonia which is present in the liquor as a non-volatile compound such as ammonium sulfate. The uranium precipitate was then calcined to produce a uranium concentrate assaying approximately 5% $U_3O_8$. The oxidant used to complete uranium precipitation was sodium hypochlorite; however, other strong oxidizing agents can be used. This may not be necessary for all leach solutions.

In order to test the effect of an oxidizing agent in the precipitation of uranium, duplicate precipitations were made on similar solutions at pH 12. The first was a control run, and the second contained the equivalent of .2 gram sodium hypochlorite per liter. Recovery of $U_3O_8$ in the control test was 77.5% compared to 100% in the test containing hypochlorite. The tests showed the effectiveness of an oxidizing agent for this ore; however, for other ores an oxidizing agent may not be required. Other tests indicated a preferred pH range of about 10 to 12 for conducting the precipitation. Tests indicated that reagent consumption for the overall process is favorable as respects economic commercial utilization of the process.

Information as to the grade of the concentrate was obtained from several lime precipitation tests using varying grades of liquor. The tests showed that the concentrate meets required specifications.

The economic feasibility of the ammonium carbonate leaching system depends largely upon the recovery and re-use of ammonia in the same sense that sodium must be re-used in leaching with sodium carbonate. Three possible ways in which ammonia can be lost in a percolation leach process are (1) in the leach liquor, (2) in the solid tails, and (3) a chemical attack which would destroy ammonia. Tests showed conclusively that a high percentage of ammonia can be recovered quite easily from the liquor and from the tails by raising the pH and steam sparging, and that there is no apparent chemical destruction of the ammonium compound to destroy the ammonia. Tests performed by percolating an ammonium carbonate solution through a percolation leach system for four days with no ore in the system showed that ammonia losses by volatilization are all within 1%, well within the limits of experimental error. Ammonia material balances on ammonium carbonate percolation leach tests of samples of various lignites are given in Table VII.

TABLE VII.—AMMONIA BALANCE ON AMMONIUM CARGONATE PERCOLATION LEACH TESTS

| Sample | Ammonia Added, lb./ton | | | Ammonia Recovered, lb./ton | | | $NH_3$ Gain (+) or Loss (−) lb./ton ore | Percent |
|---|---|---|---|---|---|---|---|---|
| | Agglomeration | Leach | Total | Liquor | Tail | Total | | |
| A–(1) | 51 | 554 | 605 | 486 | 86 | 572 | −33 | −5.4 |
| A–(2) | 60 | 173 | 233 | 170 | 67 | 237 | +4 | +1.7 |
| B | 11 | 393 | 404 | 293 | 83 | 376 | −28 | −6.9 |
| C | 27 | 235 | 262 | 211 | 49 | 260 | −2 | −.8 |
| E | None | 491 | 491 | 405 | 51 | 456 | −35 | −7.1 |

The material balances given in Table VII indicate that all of the ammonia from an ammonium carbonate percolation leach can be recovered. These test results demonstrate that (1) lignite ores can be readily agglomerated into nodules for ore beds from which uranium can be successfully leached by ammonium carbonate percolation leaching, (2) uranium can be recovered from the leach solution at low cost as a concentrate capable of further treatment to produce specification grade yellow cake and (3) ammonia can be recovered from solution and residues by heating and lime addition to drastically reduce reagent cost.

If selective recovery of uranium, molybdenum and zirconium from the carbonate strip liquor is required, this can be acomplished by a process disclosed in copending application Serial No. 302,627 filed in the U.S. Patent Office on August 16, 1963 entitled "Process for the Selective Recovery of Uranium, Zirconium and Molybdenum."

It is thus seen from the above description that the invention provides a process for the percolation leaching of carbonaceous ores of uranium and other ores which is commercially feasible. The process broadly includes the steps of nodulizing the carbonaceous ore and removing uranium from the nodules by percolation leaching. An important feature of the invention which makes possible the percolation leaching of carbonaceous ore is the nodulizing procedure by which nodules are formed which are sufficiently stable and porous to permit leaching in an ore bed with the required leaching agent. The nodules are made by cascading the ore particles accompanied by spraying the cascading ore with a water base mixture which preferably includes a portion of the leaching agent and may include an agglomerating agent, such as, wetting and flocculating agents. The nodules must be cured under high humidity conditions. The nodules are formed into a bed in the percolation leach step. Percolation leaching may be performed with either an acidic or basic agent. Preferred basic agents for uranium leaching are alkali metal carbonates and bicarbonates and ammonium carbonate and bicarbonate. Preferred acids are dilute solutions of strong mineral acids, such as sulfuric acid. Ammonium carbonate is the preferred basic leach agent and sulfuric acid is the preferred acidic leaching agent.

The acid leach is preferably performed at a pH between about 1 and 2. Uranium is recovered from the acid leach liquor by conventional solvent extraction processes. Uranium is recovered from the ammonium carbonate leach liquor by boiling off the ammonium carbonate followed by raising the pH of the solution to between about 10 and 12 with lime. A small amount of a strong oxidizing agent is added to aid the precipitation. The ammonia removed in the recovery process is recovered and re-used. The precipitated uranium is calcined to produce a uranium concentrate assaying approximately 5% $U_3O_8$. The material balances for the sulfuric acid and ammonium carbonate leach processes show that reagent consumption is favorable for commercial requirements.

The broad process is not restricted to the recovery of uranium from carbonaceous ores as the invention applies to the nodulizing of carbonaceous materials containing ores of metals in general for the purpose of removing the metals by percolation leaching, regardless of the percolation leaching reagents and procedures peculiar to the metal being recovered. This feature is illustrated by the percentage yields of zirconium and molybdenum recovered in the leach liquors even though the leaching was directed to the recovery of uranium.

Although the invention has been illustrated and described with reference to the preferred embodiments thereof, it is to be understood that it is in no way limited to the details of such embodiments, but is capable of numerous modifications with the scope of the appended claims.

What is claimed is:

1. The process for the recovery of metals selected from the group consisting of uranium, zirconium and molybdenum from ores of said metals contained in carbonaceous material which comprises: agglomerating the ore-containing material to form porous nodules; forming a percolation leach bed of the nodules; leaching the metal from the nodules by percolation leaching with a leaching agent; and recovering the metal from the leach liquor.

2. The process of claim 1 in which a portion of the leaching agent is added to the ore during agglomeration.

3. The process of claim 1 in which the nodules are cured without drying under high relative humidity conditions.

4. The process of claim 2 in which the nodules are cured without drying under high relative humidity conditions.

5. The process of claim 1 in which an agglomeration agent is added to the ore during the agglomeration step.

6. The process of claim 5 in which the agglomeration agent is a wetting agent.

7. The process of claim 5 in which the agglomeration agent is a flocculating agent.

8. The process for the recovery of metals selected from the group consisting of uranium, zirconium and molybdenum from ores of said metals contained in carbonaceous material which comprises: forming porous stable nodules of the ore-containing carbonaceous material; forming a percolation leach bed of the nodules; and percolation leaching the metal from the nodules with acid leaching solution.

9. The process of claim 8 in which the acid is sulfuric acid.

10. The process of claim 9 in which the uranium is recovered from the leach liquor by solvent extraction.

11. The process of claim 8 in which the leaching step is performed at a pH of less than about two.

12. The process of recovering metals selected from the group consisting of uranium, zirconium and molybdenum from ores of said metals contained in carbonaceous material which comprises: forming the ore-containing carbonaceous material into stable, porous nodules; forming a percolation leach bed of the nodules; percolation leaching the metal from the nodules with an alkaline leaching solution; and recovering the metal from the leach liquor.

13. The process of claim 12 in which a portion of the leaching agent is added during forming of the nodules and the nodules are cured without drying under high relative humidity conditions.

14. The process of claim 12 in which the alkaline leaching agent is a material from the class consisting of alkali metal carbonates and bicarbonates and ammonium carbonate and bicarbonate.

15. The process of claim 14 in which the leaching agent is sodium carbonate.

16. The process of claim 14 in which the leaching agent is ammonium carbonate.

17. The process of claim 16 in which uranium is recovered from the leach liquor by boiling off ammonium carbonate followed by precipitation of the uranium with lime.

18. The process of claim 17 in which the uranium is precipitated at a pH between about 10 and 12.

19. The process of claim 17 in which an oxidizing agent is added to the solution after removal of ammonium carbonate to aid in the precipitation of uranium.

20. The process for the recovery of metals selected from the group consisting of uranium, zirconium and molybdenum from ores of said metals contained in carbonaceous material which comprises: agglomerating the material into porous nodules sufficiently porous and stable to permit percolation leaching with an ammonium carbonate solution; forming a percolation leach bed of the nodules; percolation leaching the metal from the nodules with an ammonium carbonate leach solution; boiling the leach solution to remove ammonium carbonate therefrom and recovering the ammonia for re-use; precipitating the metal from the soluton with lime at a pH of between about 10 and 12; and calcining the precipitated metal to purify it.

21. The process for the recovery of metals selected from the group consisting of uranium, zirconium and molybdenum from ores of said metals contained in carbonaceous material which comprises: grinding the material to fine particles; cascading the particles in the presence of moisture to form porous nodules; curing the nodules in a humid atmosphere; forming a percolation leach bed from the nodules while moist; and percolation leaching the metal from the ore in the nodules with a leaching agent.

22. The process of claim 21 in which said particles are sprayed with a portion of the leaching agent during cascading.

23. The process of claim 22 in which the nodules are cured in an atmosphere of high relative humidity.

24. The process for the recovery of metals selected from the group consisting of uranium, zirconium and molybdenum from ores of said metals contained in carbonaceous materials which comprises: grinding the material into small particles; cascading the particles to form porous nodules while adding thereto from 10 to about 60 percent of a leaching agent based on the weight of the material; curing said nodules in an atmosphere in which the relative humidity is from about 80 to 100 percent; forming said nodules into a bed; and percolation leaching the metal from the nodules with said leaching agent.

References Cited by the Examiner

UNITED STATES PATENTS 2,982,602  5/1961  Sherk et al. _____ 23—14.5

OTHER REFERENCES

Clegg and Foley, Uranium Ore Processing, Addison-Wesley Co., 1958, pp. 115–136, 153–169, 197–199, 301, 393–394.

BENJAMIN R. PADGETT, Primary Examiner.

CARL D. QUARFORTH, Examiner.

M. J. SCOLNICK, Assistant Examiner.